United States Patent
Aya et al.

(10) Patent No.: US 11,971,856 B2
(45) Date of Patent: Apr. 30, 2024

(54) EFFICIENT DATABASE QUERY EVALUATION

(71) Applicant: Snowflake Inc., Bozeman, MT (US)

(72) Inventors: Selcuk Aya, San Carlos, CA (US); Bowei Chen, San Bruno, CA (US); Florian Andreas Funke, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 299 days.

(21) Appl. No.: 16/779,366

(22) Filed: Jan. 31, 2020

(65) Prior Publication Data
US 2021/0240670 A1 Aug. 5, 2021

(51) Int. Cl.
*G06F 16/174* (2019.01)
*G06F 16/22* (2019.01)
*G06F 16/27* (2019.01)

(52) U.S. Cl.
CPC ........ *G06F 16/1744* (2019.01); *G06F 16/221* (2019.01); *G06F 16/27* (2019.01)

(58) Field of Classification Search
CPC .... G06F 16/1744; G06F 16/27; G06F 16/221; G06F 16/283; G06F 16/24544; G06F 16/254; G06F 16/17; G06F 16/215; G06F 16/2282; G06F 16/2365; G06F 16/2456; G06F 16/278; G06F 16/23; G06F 16/2453; G06F 16/245; G06F 16/9535; G06F 16/25; G06F 16/248; G06F 16/90335; G06F 16/838
See application file for complete search history.

(56) References Cited

U.S. PATENT DOCUMENTS

| | | | | |
|---|---|---|---|---|
| 10,979,520 | B2 * | 4/2021 | Huang | H03M 7/30 |
| 2006/0116989 | A1 * | 6/2006 | Bellamkonda | G06F 16/24556 |
| 2010/0281004 | A1 * | 11/2010 | Kapoor | G06F 16/902 |
| | | | | 707/693 |
| 2015/0081650 | A1 * | 3/2015 | Lyle | G06F 16/1744 |
| | | | | 707/693 |
| 2015/0169683 | A1 * | 6/2015 | Chandramouli | G06F 16/2477 |
| | | | | 707/713 |
| 2016/0350347 | A1 * | 12/2016 | Das | G06F 16/258 |
| 2018/0165366 | A1 * | 6/2018 | Kumar | G06F 16/904 |
| 2020/0097571 | A1 * | 3/2020 | Mathur | H03M 7/30 |

* cited by examiner

Primary Examiner — Vaishali Shah
Assistant Examiner — Berhanu Mitiku
(74) Attorney, Agent, or Firm — Schwegman Lundberg & Woessner, P.A.

(57) ABSTRACT

Data in a micro-partition of a table is stored in a compressed form. In response to a database query on the table comprising a filter, the portion of the data on which the filter operates is decompressed, without decompressing other portions of the data. Using the filter on the decompressed portion of the data, the portions of the data that are responsive to the filter are determined and decompressed. The responsive data is returned in response to the database query. When a query is run on a table that is compressed using dictionary compression, the uncompressed data may be returned along with the dictionary look-up values. The recipient of the data may use the dictionary look-up values for memoization, reducing the amount of computation required to process the returned data.

26 Claims, 9 Drawing Sheets

WORKER TABLE (210)

| NAME | POSITION | SHIFT | LOCATION |
|---|---|---|---|
| KARA | DATA ENTRY | SWING | SAN JOSE |
| LARA | SALES | NIGHT | PORTLAND |
| MARLON | ENGINEER | DAY | MINNEAPOLIS |
| MERA | MANAGER | DAY | SEATTLE |
| SAMUEL | ENGINEER | DAY | SEATTLE |

SHIFT DICTIONARY (240)

| SHIFT | VALUE |
|---|---|
| SWING | 1 |
| NIGHT | 2 |
| DAY | 3 |

COMPRESSED WORKER TABLE (270)

| NAME | POSITION | SHIFT | LOCATION |
|---|---|---|---|
| KARA | DATA ENTRY | 1 | SAN JOSE |
| LARA | SALES | 2 | PORTLAND |
| MARLON | ENGINEER | 3 | MINNEAPOLIS |
| MERA | MANAGER | 3 | SEATTLE |
| SAMUEL | ENGINEER | 3 | SEATTLE |

*FIG. 2*

EFFICIENT DATABASE QUERY EVALUATION

TECHNICAL FIELD

The present disclosure generally relates to special-purpose machines that evaluate database queries, and to the technologies by which such special-purpose machines become improved compared to other special-purpose machines for evaluating database queries.

BACKGROUND

In existing database systems, when a query is received for data from a table that is stored in a compressed format, the compressed data is decompressed and filters identified in the query are applied to the decompressed data. Additionally, operations on data from the table are performed for each entry in the table.

BRIEF DESCRIPTION OF THE DRAWINGS

Various ones of the appended drawings merely illustrate example embodiments of the present disclosure and should not be considered as limiting its scope.

FIG. 2 shows an example database architecture for implementing efficient database query evaluation, according to some example embodiments.

DETAILED DESCRIPTION

Figure 1:
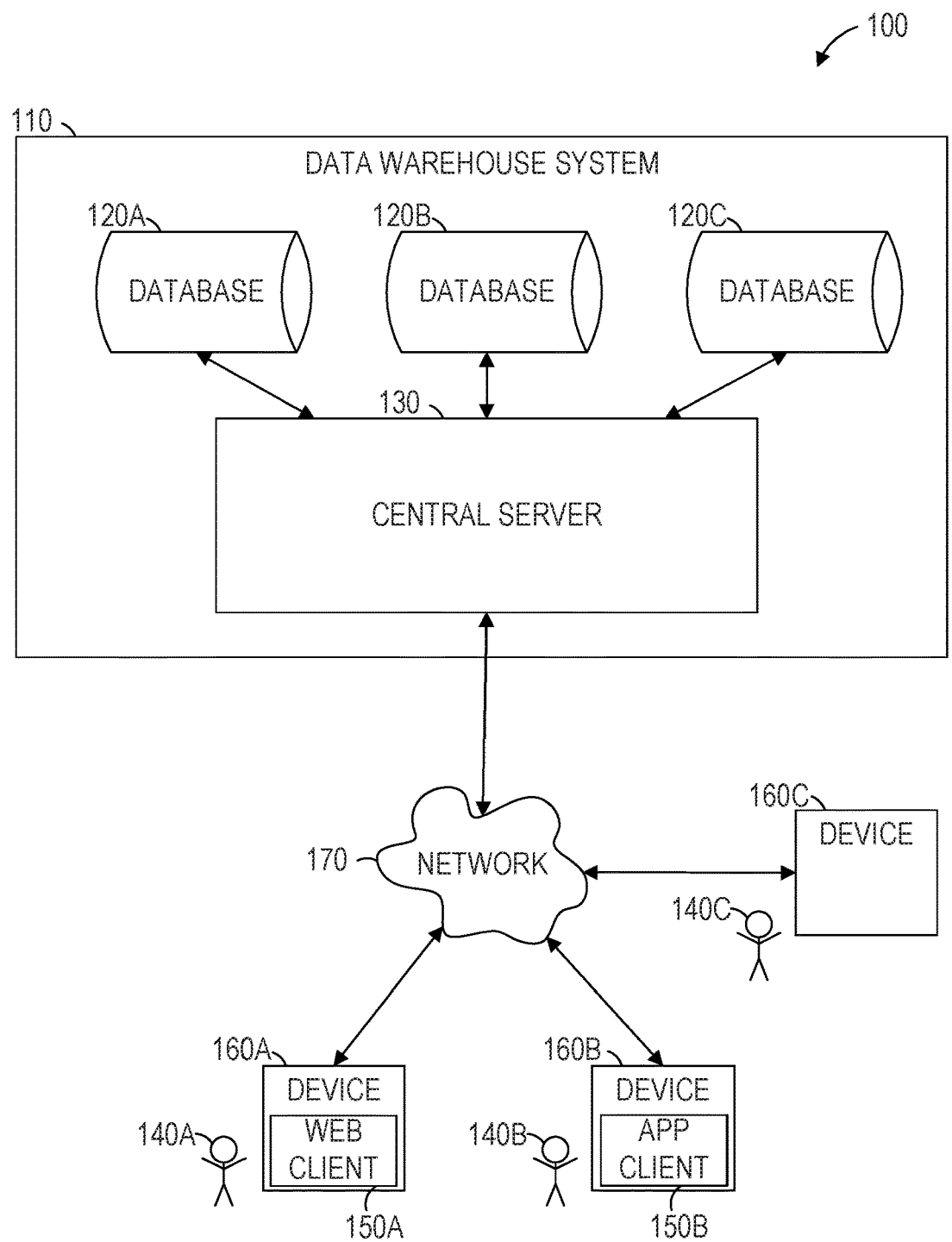
FIG. 1 illustrates an example computing environment in which a network-based data warehouse system can implement efficient database query evaluation, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, data in tables is stored in a compressed form. In response to a database query on the table comprising a filter, the portion of the data on which the filter operates is decompressed, without decompressing other portions of the data. Using the filter on the decompressed portion of the data, the portions of the data that are responsive to the filter are determined and decompressed. The responsive data is returned in response to the database query.

By contrast with prior art methods that decompress both responsive and unresponsive data before applying the filter, this method saves computing and memory resources.

The table, or portions of the table, may be compressed using dictionary compression. Dictionary compression replaces a value or set of values with a dictionary look-up value and defines a dictionary accordingly. Thus, when large values (e.g., 64-bit numbers, character strings, binary large objects (blobs)) are used repeatedly, the size of the unique dictionary look-up value is much smaller than the value being compressed and storing each value once (in the dictionary) saves space. When a query is run on a table that is compressed using dictionary compression, the uncompressed data may be returned along with the dictionary look-up values. The recipient of the data may use the dictionary look-up values for memoization, reducing the amount of computation required to process the returned data.

The table may be stored in micro-partitions. A micro-partition is a contiguous unit of storage that stores some or all of the data of a single table. In some example embodiments, each micro-partition stores between 50 and 500 MB of uncompressed data. Micro-partitions may be stored in a compressed form. Groups of entries in tables are mapped into individual micro-partitions. In relational databases comprising rows and columns, all columns for the rows of a micro-partition are stored in the micro-partition. Some large tables are stored in millions or hundreds of millions of micro-partitions. In some example embodiments, a micro-partition is a file in a file system.

Each micro-partition may be compressed independently. Thus, the efficient query evaluation methods that depend on compression may be performed for compressed micro-partitions and not performed for other micro-partitions within a single query.

A database query may perform an aggregation operation on entries in the database. The aggregation operation may be handled in two stages. In a first stage, a first aggregated data structure comprising aggregated entries is created. When the first aggregated data structure reaches a predetermined size, the data is copied from the first aggregated data structure to a second aggregated data structure and removed from the first aggregated data structure. The aggregation operation continues, filling and emptying the first aggregated data structure until all data is processed.

FIG. 1 illustrates an example computing environment 100 in which a network-based data warehouse system 110 can implement efficient database query evaluation, according to some example embodiments. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the computing environment 100 to facilitate additional functionality that is not specifically described herein.

As shown, the computing environment 100 comprises the network-based data warehouse system 110 and computing devices 160A, 160B, and 160C, all connected via a network 170. The data warehouse system includes a central server 130 and databases 120A, 120B, and 120C. The network-based data warehouse system 110 is a network-based system used for storing and accessing data (e.g., internally storing data, accessing external remotely located data) in an integrated manner, and reporting and analyzing the integrated data. The data warehouse system may be implemented on a cloud computing platform comprising a plurality of computing machines that provides on-demand computer system resources such as data storage and computing power to the network-based data warehouse system 110.

The computing devices 160A-160C each comprises one or more computing machines that execute a remote software component 150A or 150B to provide functionality to users 140A, 140B, and 140C of the network-based data warehouse system 110. For convenience, the computing devices 160A-160C may be referred to generically as a device 160 or in the aggregate as devices 160. Similarly, the remote software components 150A-150B may be referred to specifically as a web client 150A and an application client 150B; in the aggregate as remote software components 150; or generically as a remote software component 150. The web client 150A operates within a web browser. The application client 150B is a standalone application.

Each remote software component 150 comprises a set of machine-readable instructions (e.g., code) that, when executed by the computing device 160, cause the computing device 160 to provide certain functionality. The remote software component 150 may operate on input data and generate result data based on processing, analyzing, or otherwise transforming the input data. As an example, the remote software component 150 can be an application used by an administrator to define future grants, an application used by a user to create database objects subject to the future grants, or any suitable combination thereof.

The central server 130 is coupled to databases 120A-120C, which are associated with the entirety of data stored by the network-based data warehouse system 110. The databases 120A-120C store data pertaining to various functions and aspects associated with the network-based data warehouse system 110 and its users. For example, each of the databases 120A-120C may store data for a different tenant of the network-based data warehouse system 110. A tenant is a set of users who share access to data, such that no tenant can access data of another tenant absent explicit authorization to do so.

The central server 130 receives database queries via the network 170 and determines an evaluation plan to retrieve responsive data from the databases 120 and provide the responsive data to the requesting device 160. In various data warehouse systems, different methods of evaluating queries are used. For example, the databases 120 may provide all data from all tables involved in the query to the central server 130. In this example, the central server 130 processes the query to determine which portions of the data are responsive to the query. As another example, the central server 130 may provide the query to each of the databases 120, receive the responsive data held on each database, and do no processing other than concatenating the received results.

Using systems and methods described herein, instructions and data are communicated between the central server 130 and the databases 120 to allow for efficient evaluation of database queries. In some example embodiments, filters are provided to the databases 120 so that, by applying the filter within the database 120, less data is transmitted from the database 120 to the central server 130. Additionally, depending on the filter applied and the structure of the data, operations of the database 120 in applying the filter may be saved. For example, if the data is stored in a compressed structure that is indexed by a primary identifier, filtering on the primary identifier may allow the database 120 to decompress only the responsive data. As another example, if the data is stored in a compressed structure that is not indexed on the filtered criteria, only the portion of the compressed data that is needed to determine the responsive entries is decompressed in a first pass and then the identified responsive entries are decompressed in a second pass. This can save data accesses and processing time by comparison with implementations that decompress all data and apply the filter on the decompressed data, as would be the case when the filtering is performed by the central server 130.

In some example embodiments, each of the databases 120A-120C are stored in a cloud computing platform. For example, each of the databases 120A-120C may be stored on data storage devices in a public cloud infrastructure or a private cloud infrastructure. The data storage devices may be hard disk drives (HDDs), solid state drives (SSDs), storage clusters, Amazon S3@ storage systems or any other data storage technology. Additionally, the data storage devices may include distributed file systems (such as Hadoop Distributed File Systems (HDFS)), object storage systems, and the like.

Though shown as using a single central server 130, network-based data warehouse system 110 may comprise a plurality of compute nodes (e.g., virtual warehouses). A set of processes on a compute node executes a query plan to execute database queries. As used herein, the term "database query" refers to all database commands, not merely those that seek to retrieve data. Thus, a command to modify data in entries or a command to add new entries to one table based on existing entries in another table would both be "database queries."

In some example embodiments, communication links between elements of the network-based data warehouse system 110 are implemented via one or more data communication networks. These data communication networks may utilize any communication protocol and any type of communication medium. In some example embodiments, the data communication networks are a combination of two or more data communication networks (or sub-networks) coupled to one another. These communication links may be implemented using any type of communication medium and any communication protocol.

In various example embodiments, one or more portions of the network 170 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 170 or a portion of the network 170 may include a wireless or cellular network, and the coupling between the network 170, the devices 160, and the central server 130 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The data storage devices storing the databases 120A-120C are, in some example embodiments, decoupled from the computing resources associated with the network-based data warehouse system 110. Thus, new virtual warehouses can be created and terminated in the network-based data warehouse system 110 and additional data storage devices can be created and terminated in the network-based data warehouse system 110 in an independent manner. This architecture supports dynamic changes to the network-based data warehouse system 110 based on the changing data storage and retrieval needs as well as the changing needs of the users and systems accessing the network-based data warehouse system 110. The support of dynamic changes allows the network-based data warehouse system 110 to scale quickly in response to changing demands. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other user's systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

The central server 130, databases 120A-120C, and computing devices 160A-160C are shown in FIG. 1 as individual components. However, each of the central server 130, databases 120A-120C, and computing devices 160A-160C may be implemented as a distributed system (e.g., distributed across multiple systems/platforms at multiple geographic locations) connected by APIs and access information (e.g., tokens, login data). Additionally, each of the central server 130, databases 120A-120C, and computing devices 160A-160C can be scaled up or down (independently of one another) depending on changes to the requests received and the changing needs of the network-based data warehouse system 110. Thus, in the described embodiments, the network-based data warehouse system 110 is dynamic and supports regular changes to meet the current data processing needs.

FIG. 2 shows an example database architecture 200 for implementing efficient database query evaluation, according to some example embodiments. The database architecture 200 comprises a worker table 210 and a shift dictionary 240.

The worker table 210 contains rows 230A, 230B, 230C, 230D, and 230E, each containing data in a format 220. The shift dictionary 240 contains entries 260A, 260B, and 260C, each containing data in a format 250. The compressed worker table 270 contains rows 290A, 290B, 290C, 290D, and 290E, each containing data in a format 280. The compressed worker table 270, in conjunction with the shift dictionary 240, contains the same data as the worker table 210 while consuming less storage space.

In some example embodiments, the network-based data warehouse system 110 stores data in micro-partitions. Each micro-partition contains one or more entries of a table. The table may be stored entirely in a single micro-partition or span millions of micro-partitions. Each micro-partition may be compressed. The method of compression is determined on a system basis, a database basis, a table basis, a micro-partition basis, or any suitable combination thereof.

Various methods of compression are contemplated including, but not limited to, dictionary compression. In dictionary compression, entries are reduced in size by replacing a value of a field with a smaller dictionary value. The dictionary values are stored in a dictionary along with the corresponding field value. The total consumption of the dictionary compression is thus one copy of every field value and one copy of every dictionary value to compose the dictionary, plus a dictionary value for each entry in the compressed table. So long as this is smaller than the uncompressed data (one field value for each entry in the table), space savings results. This calculation can easily be performed by consideration of the data to be compressed, and thus the compression is only performed if a space savings results.

Each of the rows 230A-230E of the worker table 210 identifies the name, position, shift, and location of a worker. Thus, the row 230A indicates that Kara performs data entry on the swing shift in San Jose. The row 230B indicates that Lara is in sales, working the night shift in Portland. The row 230C shows that Marion is an engineer, working the day shift in Minneapolis. The row 230D indicates that Mera is a manager in Seattle, working days. The row 230E shows that Samuel is an engineer in Seattle, also working days.

The worker table 210 could be stored using dictionary compression by replacing the shift field with a dictionary entry, as shown in the compressed worker table 270. Each of the rows 29A-290E contains the same data as its corresponding row in the worker table 210, but the shift field of the data format 220 has been replaced by a shift dictionary entry in the data format 280. The shift dictionary entry is used as a look up into the shift dictionary 240 to determine the value of the shift field. Though FIG. 2 shows the shift dictionary 240 as including both the shift value and the dictionary value, in some example embodiments, the dictionary value is the index into the dictionary and thus does not need to be explicitly stored.

If stored as ASCII text (as in the worker table 210), the shift field would need to consume a minimum of five bytes per row, to contain the characters "SWING." However, since there are only three distinct values, the dictionary index could be reduced to a size as small as two bits. In some example embodiments, a larger minimum size is imposed (e.g., one byte, one word, one double-word, or one quad-word). Assuming one byte as a minimum size, storage of the shift data is reduced from five bytes per row to one byte per row plus six bytes per dictionary entry. Thus, the uncompressed worker table 210 consumed at least twenty-five bytes for the five shift fields, but the compressed worker table 270 (including the shift dictionary 240) consumes only twenty-three bytes. In example embodiments in which the dictionary value is implicit from the position of the entry and not explicitly stored, the data savings is even greater. Furthermore, the greater the replication of values in the compressed field, the greater the savings from dictionary compression.

In some example embodiments, the database 120 stores relational database data structured as collections of columns and rows, where tables can include references to other tables (e.g., keys, indices, or shared columns such as consumer name). Although relational database structures are discussed here as examples, it is appreciated that in some example embodiments the data managed by the network-based data warehouse system 110 can be data structured in a non-relational database format (e.g., no-SQL, Hadoop, Spark frames, or others).

Figure 3:
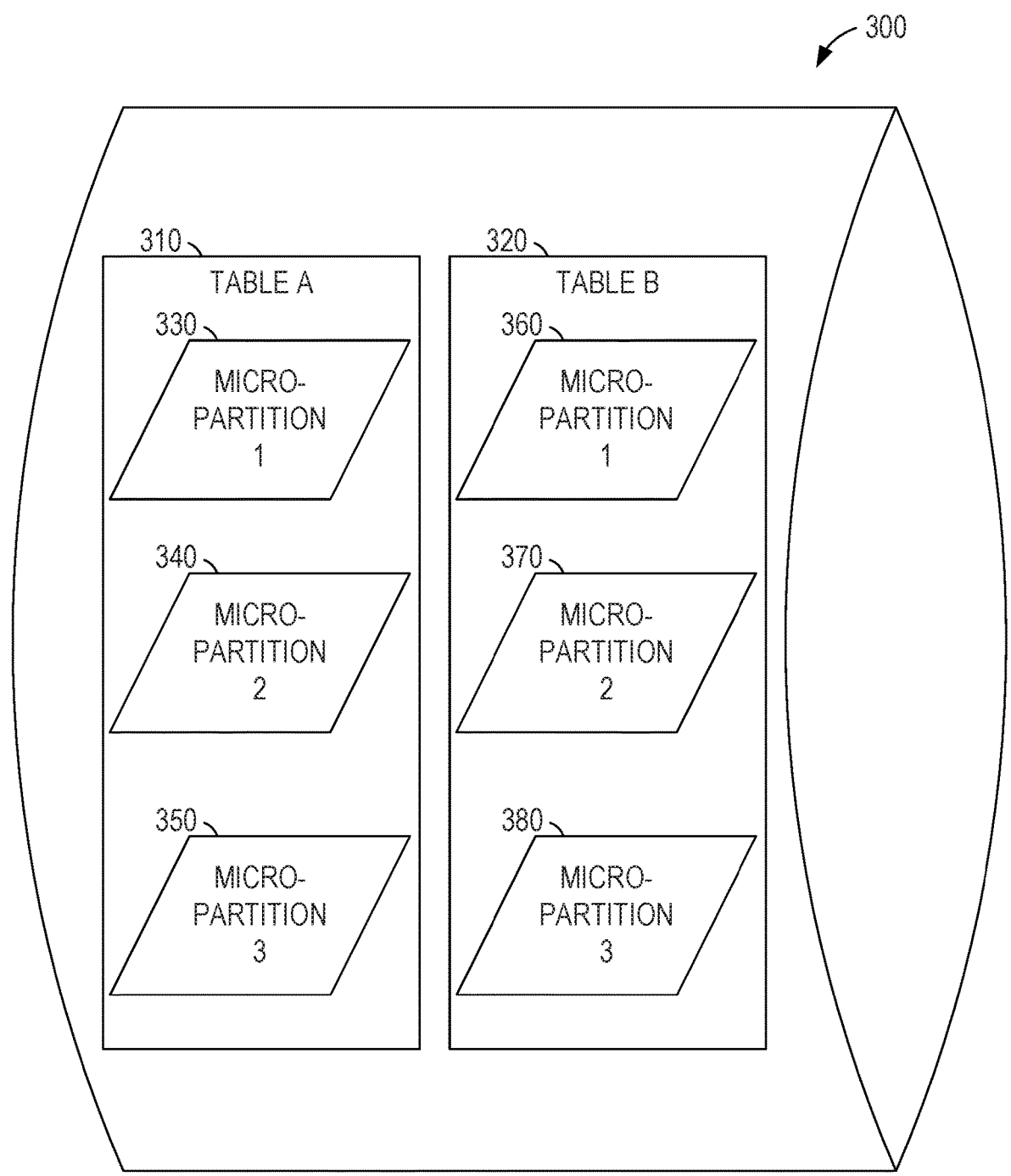
FIG. 3 is a block diagram illustrating storage of database tables in micro-partitions, according to some example embodiments.

FIG. 3 is a block diagram of a database 300 illustrating storage of database tables in micro-partitions, according to some example embodiments. The database 300 includes tables 310 and 320. The table 310 is stored in micro-partitions 330, 340, and 350. The table 320 is stored in micro-partitions 360, 370, and 380. Each micro-partition may be implemented as a file in a file system.

Each of the micro-partitions 330-380 may be compressed or uncompressed. Furthermore, each of the compressed micro-partitions may be compressed using a different compression algorithm. Thus, the micro-partition 330 may have a first column stored using dictionary compression, the micro-partition 340 may be stored uncompressed, and the micro-partition 350 may store a second column using dictionary compression. Similarly, the micro-partition 360 may have a first column stored using dictionary compression, the micro-partition 370 may have the first column and a second column stored using dictionary compression, and the micro-partition 380 may be stored using run-length encoding for the same or different columns.

Figure 4:
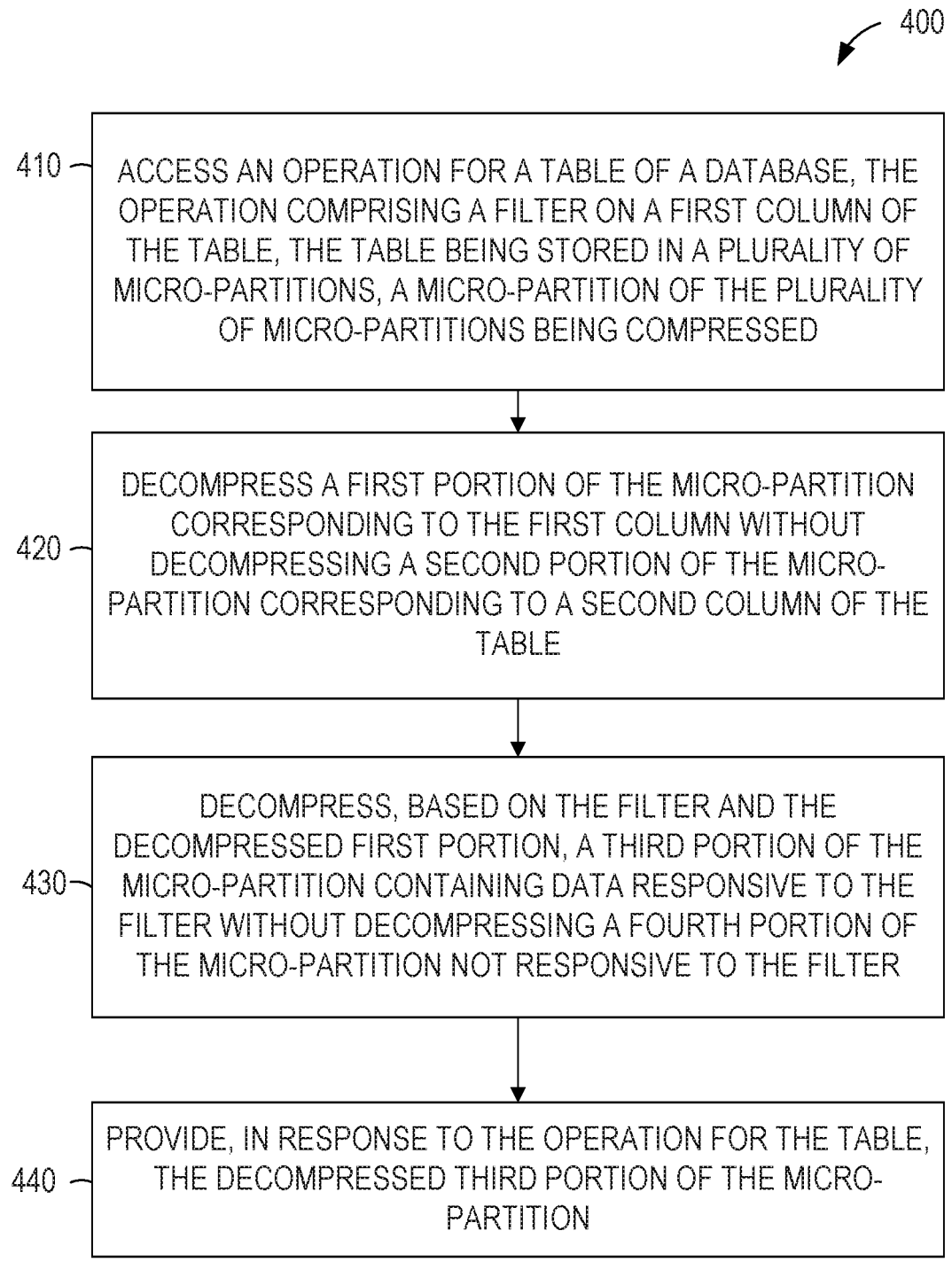
FIG. 4 is a flow diagram of a method for implementing efficient database query evaluation, according to some example embodiments.

FIG. 4 is a flow diagram of a method 400 for implementing efficient database query evaluation, according to some example embodiments. The method 400 includes the operations 410, 420, 430, and 440. By way of example and not limitation, the method 400 is described as being performed by the data warehouse system 110 of FIG. 1 and the computer system 900 of FIG. 9.

In operation 410, the filter module 960 of the central server 130 accesses an operation for a table of a database. The operation comprises a filter on a first column of the table, which is stored in a plurality of micro-partitions, at least one of which is compressed. For example, the query "select * from worker where shift='DAY'" may be sent from the web client 150A to the central server 130 via the network 170. In this example, the filter comprises a value ("DAY") on the first column ("shift"). The worker table 210 of FIG. 2 may be stored as the table 310 of FIG. 3, divided into micro-partitions 330-350. For this discussion, we may assume that the micro-partition 330 is compressed and contains the entries shown in FIG. 2. The micro-partitions 340 and 350 contain additional entries and are compressed or uncompressed, in various embodiments.

In some example embodiments, the micro-partition is compressed using dictionary compression for one or more columns of data. Dictionary compression reduces storage space when a column has few distinct values by replacing each value with a dictionary index. Thus, as shown in FIG. 2, character strings consuming multiple bytes of memory may each be replaced with single-byte integers. In various example embodiments, different types of data are compressed (e.g., date, timestamp, string, or blob) and used for the dictionary lookup (e.g., char, int, or long).

The filter may be applied directly to the decompressed data or using a Bloom filter. For a direct application of the filter, each value is compared to the filter criteria and matching entries are identified, as described below for operation 420. Using a Bloom filter, the values in a micro-partition are hashed and the hashed values are stored in a lossy compressed format. A filter criterion is also hashed and, if the hash of the filter matches any hashed values of the micro-partition, processing of the micro-partition continues with operation 420. However, if the hash of the filter does not match any of the hashed values, the micro-partition does not include any matching entries and further processing of the micro-partition is skipped. In some example embodiments, a dictionary is created for each micro-partition. Instead of hashing a value of a column for each entry in the micro-partition, the entries in the dictionary are hashed, ensuring that all values in the micro-partition are hashed and that each value is hashed only once. By comparison with methods that hash values from the entries instead of from the dictionary, computation time is reduced without sacrificing accuracy of the Bloom filter. Furthermore, computation is optimized away for dictionary encoded columns.

The filter module 960 or the dictionary module 965 of the database 120A, in operation 420, decompresses a first portion of the micro-partition corresponding to the first column without decompressing a second portion of the micro-partition corresponding to a second column of the table. Continuing with the example, the shift column of the worker table 310 is decompressed while one or all of the remaining columns are not decompressed. Thus, by comparison with systems that decompress the entire micro-partition to apply the filter, processing operations are saved by decompressing only the column that is being filtered. In some example embodiments, the central server 130 provides the operation to each of the databases 120A-120C containing portions of the table, enabling each database 120 to perform operation 420 for the compressed micro-partitions it stores.

In operation 430, the filter module 960 or the dictionary module 965 of the database 120A decompresses, based on the filter and the decompressed first portion, a third portion of the micro-partition containing data responsive to the filter without decompressing a fourth portion of the micro-partition not responsive to the filter. For example, the rows 230C-230E are responsive to the filter "where shift='DAY'" and are decompressed while the rows 230A-230B have different shift values, are unresponsive to the filter, and are not decompressed.

The filter module 960 of the database 120A provides, in response to the operation for the table, the decompressed third portion of the micro-partition (operation 440). Results from other compressed micro-partitions of the table may be obtained by performing operations 420 and 430 for those micro-partitions. Results from the uncompressed micro-partitions may be obtained directly, without the use of decompression. The results from all micro-partitions of the table are aggregated to generate the result of the operation and provided in response. The use of compressed micro-partitions and the improved database query evaluation of the method 400 are invisible to the querying device. In some example embodiments, the central server 130 aggregates responses from the databases 120A-120C and provides the response to the querying device (e.g., the device 160A).

Figure 5:
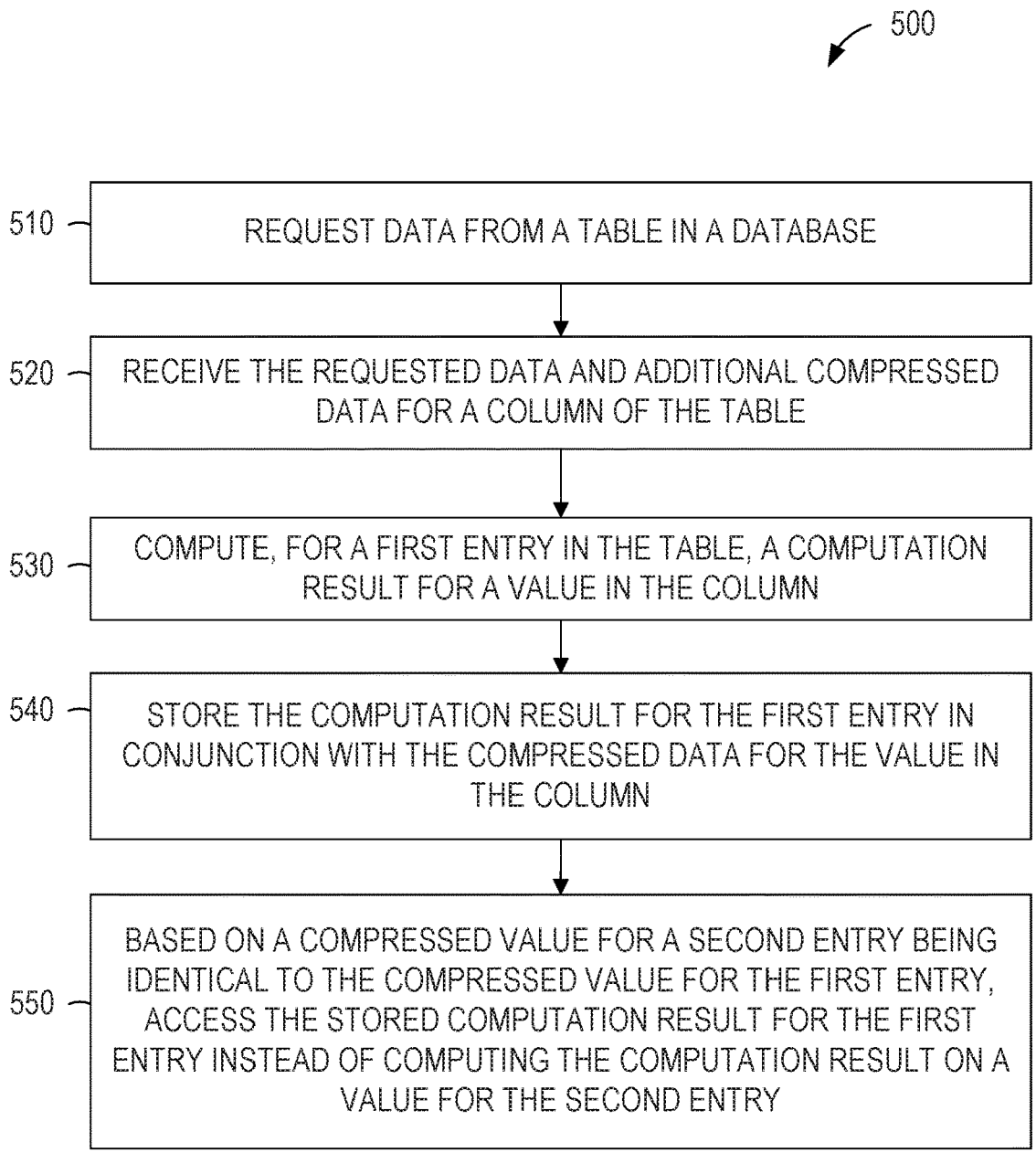
FIG. 5 is a flow diagram of a method for implementing efficient database query evaluation, according to some example embodiments.

FIG. 5 is a flow diagram of a method 500 for implementing efficient database query evaluation, according to some example embodiments. The method 500 includes the operations 510, 520, 530, 540, and 550. By way of example and not limitation, the method 500 is described as being performed by the data warehouse system 110 of FIG. 1 and the computer system 900 of FIG. 9.

In operation 510, the central server 130 requests data from a table in a database. As an example, the query "select name, md5(shift) from worker" is received by the central server 130 from the device 160A. In response to receiving the query, the central server requests data from the work table from each of the databases 120A-120C. If the query included a filter, appropriate portions of the method 400 could be performed by the databases 120A-120C in determining the responsive entries in the table.

The central server 130, in operation 520, receives the requested data and additional compressed data for a column of the table. Thus, in this example, the responsive data shown in rows 230A-230E is returned along with the compressed shift values shown in the table 270. Since the database 120A began with the compressed table 270, including the compressed shift values, the uncompressed shift values, retrieved from the shift dictionary 240, are added to the set of responsive data instead of replacing the compressed shift values. The central server 130 begins iterating over the responsive entries to determine a calculation for the entries.

In operation 530, the central server 130 computes, for a first entry in the table, a computation result for a value in the column. Thus, in this example, the md5 hash of the string "SWING" is computed for the row 230A. This operation is repeated for each entry with a compressed value that has not already been operated on as the central server 130 iterates over the responsive entries.

The central server 130 stores the computation result for the first entry in conjunction with the compressed data for the value in the column (operation 540). Accordingly, on encountering the row 230A, the md5 hash of "SWING" is stored in conjunction with the compressed value 1. On encountering the row 230B, the md5 hash of "NIGHT" is stored in conjunction with the compressed value 2. On encountering the row 230C, the md5 hash of "DAY" is stored in conjunction with the compressed value 3.

In operation 550, the central server 130, based on a compressed value for a second entry being identical to the compressed value for the first entry, accesses the stored computation result for the first entry instead of computing the computation result on a value for the second entry. In this example, on encountering the row 230D, the central server 130 recognizes that a value has already been stored in conjunction with the compressed value 3, and instead of recalculating the md5 hash of "DAY," instead accesses the stored computation value generated when processing the row 230C. This process of avoiding repetition of computation by determining that the input is the same is referred to as memoization.

Thus, for each entry in the table either operations 520-540 are performed or operations 520 and 550 are performed. By comparison with prior art implementations that perform the computation for every entry (as in operation 530), computation resources are saved and the database query evaluation is made more efficient. The central server 130 provides, in response to the query from the device 160A, the responsive data. In this example, the responsive data is a set of names and md5 hashes of shifts.

Figure 6:
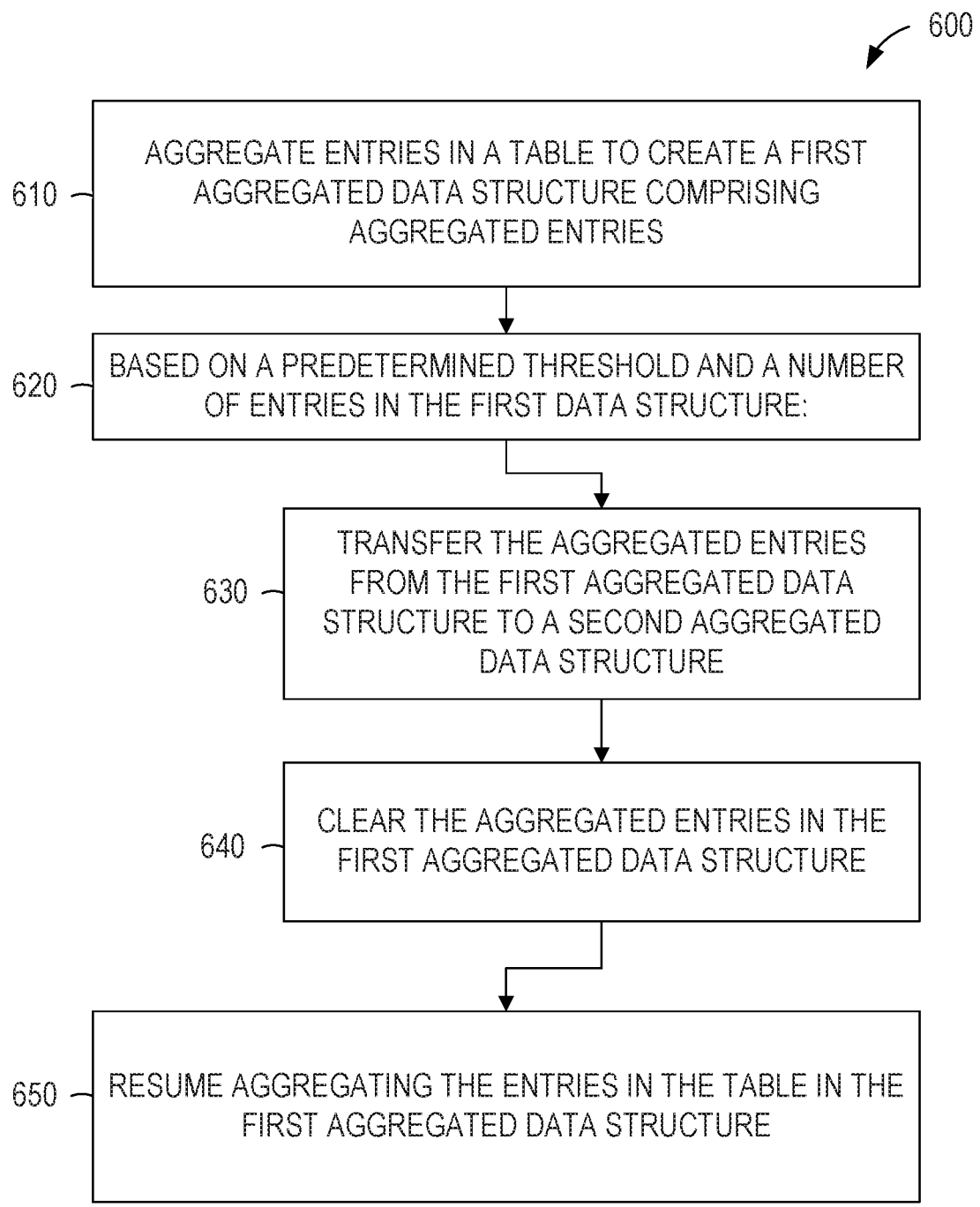
FIG. 6 is a flow diagram of a method for implementing efficient database query evaluation, according to some example embodiments.

FIG. 6 is a flow diagram of a method 600 for implementing efficient database query evaluation, according to some example embodiments. The method 600 includes operations 610, 620, 630, 640, and 650. By way of example and not limitation, the method 600 is described as being performed by the data warehouse system 110 of FIG. 1 and the computer system 900 of FIG. 9.

In operation 610, the aggregation module 970 of the central server 130 aggregates entries in a table to create a first aggregated data structure comprising aggregated entries. For example, consider a table containing time entries for workers. Each time entry indicates a worker, an employee category, a start time, and an end time. A query "select sum(endTime−startTime) from timeEntryTable group by workerId" would report the total time worked by each employee. The central server 130 iterates over the entries in the timeEntryTable and, while processing a first subset of the rows, creates new entries in a first aggregated data structure for each row containing a new workerId and updates existing entries in the first aggregated data structure for each row containing a workerId already encountered.

In some example embodiments, the data being aggregated includes compressed values. For example, the data may be requested as in operation 510 of the method 500 and, in addition to the requested data, additional compressed data is received as in operation 520. In these example embodiments, the determination that two entries should be aggregated may be based on the compressed data. For example, the query "select sum(endTime−startTime) from timeEntry table group by shift" would report the total time worked in each shift. If the shift fields are compressed using the shift dictionary 240 (of FIG. 2), the appropriate dictionary values (in the range 1-3) may be returned for each row in addition to the string identifying the shift. In comparing a newly encountered entry with an existing aggregated entry, the aggregation module 970 is enabled to perform a single integer comparison on the dictionary value instead of performing a string compare operation. Since the integer comparison consumes less memory and fewer processor cycles, this substitution improves efficiency of the database query evaluation. In some example embodiments, hash computation and aggregation is optimized for dictionary encoded columns in the first data structure. More complicated filters operate on multiple columns. These filters can also be handled using compressed data so long as each filtered column is compressed. Alternatively, if one column is compressed and another is not, the matches for the compressed columns are determined using the compressed values and the matches for the uncompressed columns are determined using the uncompressed data.

The aggregation module 970, in operation 620, based on a predetermined threshold and a number of entries in the first data structure, performs operations 630 and 640. For example, operations 630 and 640 may be performed in response to the first aggregated data structure reaching a size of twenty entries, corresponding to twenty unique workerIds being encountered as the central server 130 iterates over the entries.

In operation 630, the aggregation module 970 transfers the aggregated entries from the first aggregated data structure to a second aggregated data structure. This operation includes updating the second aggregated data structure to incorporate the transferred entries. Continuing with the example, entries in the first aggregated data structure having different workerIds than entries already in the second aggregated data structure are copied to the second aggregated data structure and entries having workerIds with corresponding aggregated entries in the second aggregated data structure would be transferred by updating the entries in the second aggregated data structure (e.g., by adding the sum in the first aggregated data structure to the sum already stored in the second aggregated data structure).

The aggregated entries in the first aggregated data structure are cleared by the aggregation module 970 after they are transferred (operation 640). Thereafter, the aggregation module 970 resumes, in operation 650, aggregating the entries in the table in the first aggregated data structure. Operations 630 and 640 are performed when the last entry being aggregated is processed and the results in the second aggregated data structure are returned as being responsive to the query. In this way, the size of the first aggregated data structure is capped at the threshold number of entries but the size of the second aggregated data structure is not capped. This allows, for example, the first aggregated data structure to be stored in RAM or a high-speed cache while the second aggregated data structure is stored in a slower-access memory device (e.g., a hard disk or slower RAM).

Figure 7:
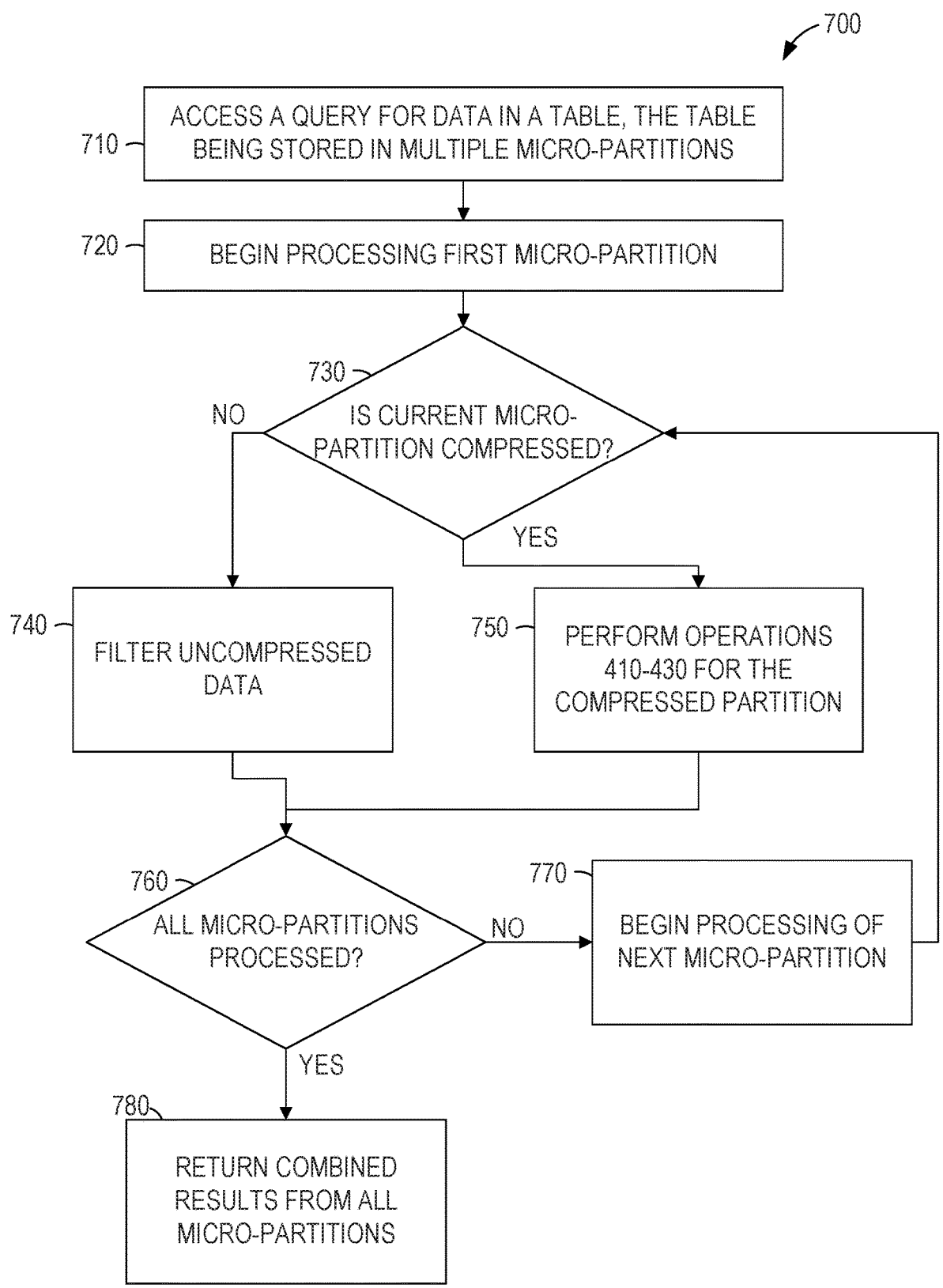
FIG. 7 is a flow diagram of a method for implementing efficient database query evaluation, according to some example embodiments.

FIG. 7 is a flow diagram of a method 700 for implementing efficient database query evaluation, according to some example embodiments. The method 700 includes the operations 710, 720, 730, 740, 750, 760, and 770. By way of example and not limitation, the method 700 is described as being performed by the data warehouse system 110 of FIG. 1 and the computer system 900 of FIG. 9.

In operation 710, a database (e.g., the database 120A) accesses a query for data in a table, the table being stored in multiple micro-partitions. For example, the query may request data from the table 310 of FIG. 3, stored in the micro-partitions 330-350. The method 700 may be performed in parallel by multiple databases (e.g., all three of the databases 120A-120C), wherein the results provided by the multiple databases are combined (e.g., by the central server 130) before providing a response to the query (e.g., a query received from the device 160A via the network 170).

The database, in operation 720, begins processing the first micro-partition (e.g., the micro-partition 330). If the current micro-partition is compressed (operation 730), the method 700 proceeds with operation 750. Otherwise, the method 700 proceeds with operation 740.

In operation 740, the database filters the uncompressed data of the micro-partition. Alternatively, in operation 750, operations 410-430 of the method 400 are performed for the compressed partition, retrieving the responsive data without decompressing the unresponsive data. After performing either operation 740 or 750, the method 700 continues with operation 760.

If all micro-partitions have been processed (operation 760), the method 700 completes by, in operation 780, returning the combined results from all micro-partitions. If all micro-partitions have not been processed, the method 700 continues by, in operation 770, beginning processing of the next micro-partition (e.g., the micro-partition 340) and processing that micro-partition using operations 730-760. In this way, the optimizations provided by the method 400 are realized in each compressed micro-partition, without requiring that the entire table be compressed. Additionally, different micro-partitions can be compressed using different algorithms, allowing the most effective algorithm to be used on each micro-partition, further improving the space savings resulting from compression.

Figure 8:
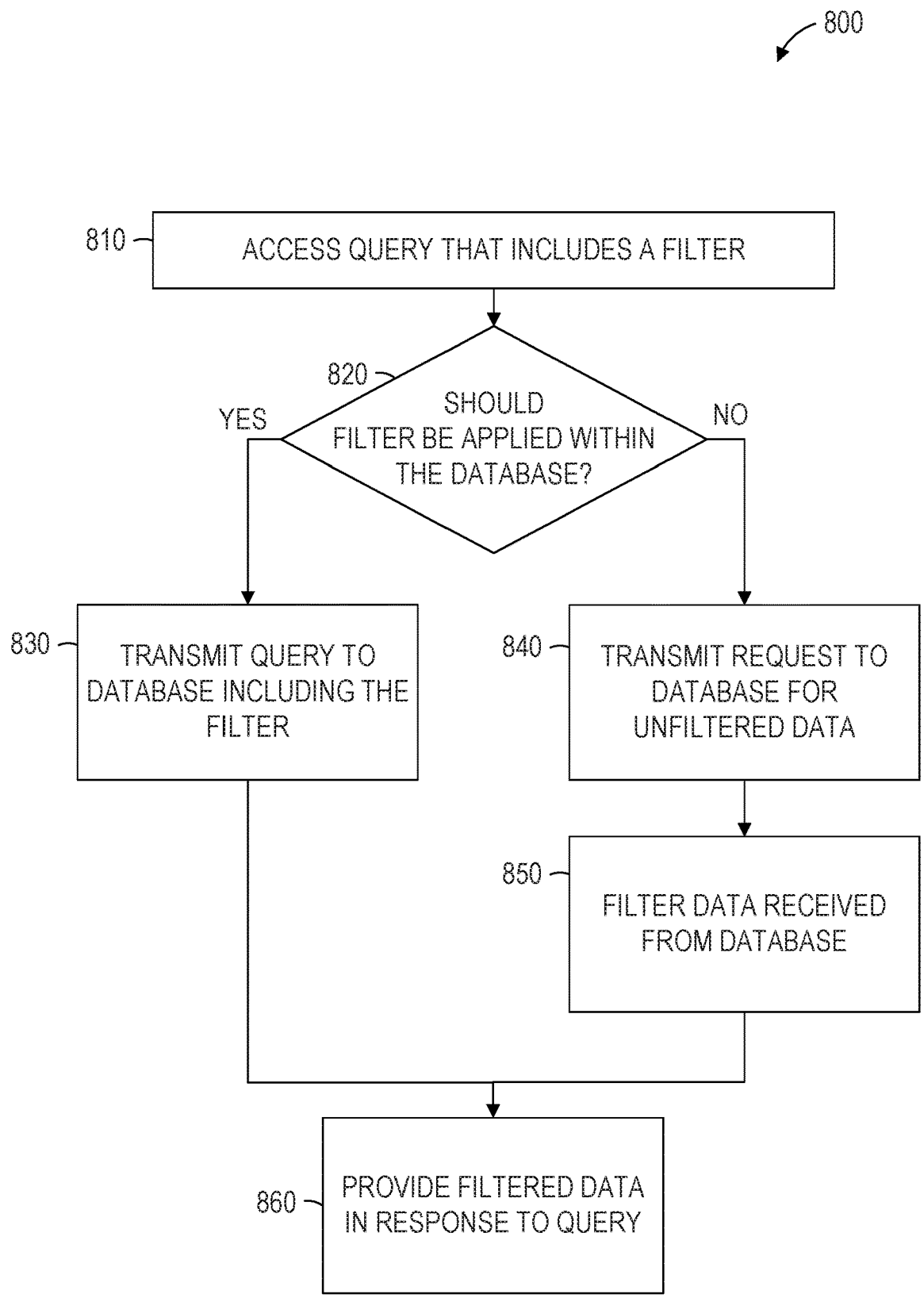
FIG. 8 is a flow diagram of a method for implementing efficient database query evaluation, according to some example embodiments.

FIG. 8 is a flow diagram of a method 800 for implementing efficient database query evaluation, according to some example embodiments. The method 800 includes the operations 710, 720, 730, 740, 750, 760, and 770. By way of example and not limitation, the method 700 is described as being performed by the data warehouse system 110 of FIG. 1 and the computer system 900 of FIG. 9.

In operation 810, the central server 130 accesses a query that includes a filter. For example, the query "select a, b, c, d, e from t where f(a)=x" may be accessed. This query requests five columns of data from the table t, but only for the rows where a function of the column "a" is equal to a predetermined value.

The central server 130, in operation 820, determines if the filter should be applied within the database. If so, the central server 130 transmits the query to the database and includes the filter (operation 830). The database may process the query using the method 400. Otherwise, in operation 840, the central server transmits a request to the database for unfiltered data. In this example, the request for unfiltered data would "select a, b, c, d, e, from t" without including a filter. If unfiltered data was requested, the central server 130 filters the data received from the database (operation 850).

The filtered data is provided in response to the query by the central server 130 in operation 860. Thus, when a query is more efficiently processed by the database instead of the central server 130, the database performs the filtering. If filtering cannot be performed in the database or the filtering is more efficient if performed by the central server 130, filtering is performed by the central server 130. In this way, the enhanced methods of database query evaluation described herein are used only when applicable, without losing any existing functionality.

In various example embodiments, different criteria are used in operation 820 to determine if the filter should be applied within the database. In some example embodiments:

For "select a, b, c, d, e from t where f(a)=x" the filter "f(a)=x" is performed in the database.

For "select a, b, c, d, e from t where f(a)=x or f(b)=y" no filter is performed in the database because the filtering criteria are disjunct.

For "select a, b, c, d, e from t where g(a,b)=x" no filter is performed in the database because the filter is a function of multiple columns.

For "select a, b, c, d, e from t where f(a)=x and f(b)=y and g(a,b)=z" the two filters "f(a)=x" and "f(b)=y" are provided to the database and the filters applied there, but the filter "g(a,b)=z" is applied by the central server 130.

As can be seen from the second and fourth examples above, the determination in operation 820 of whether a filter should be applied within the database may be made on a filter-by-filter basis for a query comprising multiple filters. When fewer than all filters are handled by the database, the central server 130 performs operation 850 to apply the remaining filters. Accordingly, in some example embodiments, operation 830 is followed by operation 850 for the remaining filters before the method 800 terminates with the operation 860.

Figure 9:
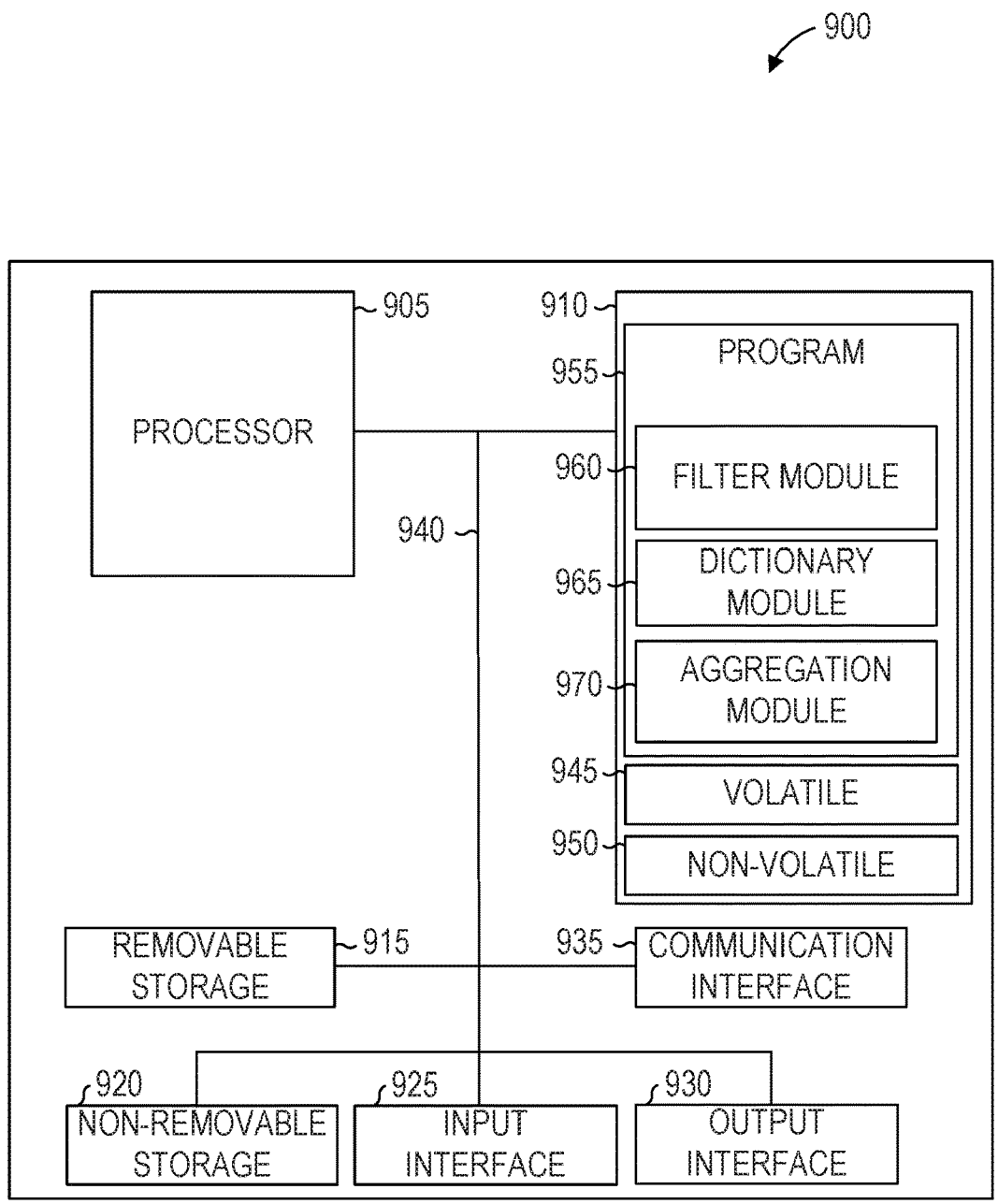
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine in the form of a computer system 900 within which a set of instructions may be executed for causing the machine to perform any one or more of the methodologies discussed herein, in accordance with some embodiments of the present disclosure. All components need not be used in various embodiments. For example, clients (e.g., the devices 160A-160C), servers (e.g., the central server 130), autonomous systems, and cloud-based network resources (e.g., the databases 120A-120C) may each be use a different set of components, or, in the case of servers for example, larger storage devices.

The computer system 900 includes a processor 905, a computer-storage medium 910, removable storage 915, and non-removable storage 920, all connected by a bus 940.

Although the example computing device is illustrated and described as the computer system 900, the computing device may be in different forms in different embodiments. For example, the computing device 900 may instead be a smartphone, a tablet, a smartwatch, or another computing device including elements the same as or similar to those illustrated and described with regard to FIG. 9. Devices such as smartphones, tablets, and smartwatches are collectively referred to as "mobile devices." Further, although the various data storage elements are illustrated as part of the computer 900, the storage may also or alternatively include cloud-based storage accessible via a network, such as the Internet, or server-based storage.

The processor 905 may be a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof. The term "processor" is intended to include multi-core processors that may comprise two or more independent processors (sometimes referred to as "cores") that may execute instructions contemporaneously. Although FIG. 9 shows a single processor 905, the computer system 900 may include a single processor with a single core, a single processor with multiple cores (e.g., a multi-core processor), multiple processors with a single core, multiple processors with multiple cores, or any combination thereof.

The computer-storage medium 910 includes volatile memory 945 and non-volatile memory 950. The volatile memory 945 or the non-volatile memory 950 stores a program 955. The computer 900 may include, or have access to, a computing environment that includes a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions embodying any one or more of the methodologies or functions described herein. The instructions may also reside, completely or partially, within the processor 905 (e.g., within the processor's cache memory) during execution thereof by the computer system 900.

The computer system 900 includes or has access to a computing environment that includes an input interface 925, an output interface 930, and a communication interface 935. The output interface 930 interfaces to or includes a display device, such as a touchscreen, that also may serve as an input device. The input interface 925 interfaces to or includes one or more of a touchscreen, a touchpad, a mouse, a keyboard, a camera, one or more device-specific buttons, one or more sensors integrated within or coupled via wired or wireless data connections to the computer system 900, and other input devices. The computer system 900 may operate in a networked environment using the communication interface 935 to connect to one or more remote computers, such as database servers. The remote computer may include a personal computer (PC), server, router, network PC, peer device or other common network node, or the like. The communication interface 935 may connect to a local-area network (LAN), a wide-area network (WAN), a cellular network, a WiFi network, a Bluetooth network, or other networks.

Computer instructions stored on a computer-storage medium (e.g., the program 955 stored in the computer-storage medium 910) are executable by the processor 905 of the computer system 900. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 905. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 955 may further be transmitted or received over the networks 170 using a transmission medium via the communication interface 935 and utilizing any one of a number of well-known transfer protocols (e.g., HTTP). Examples of networks 170 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer system 900, and includes digital or analog communications signals or other intangible media to facilitate communication of such software.

The program 955 is shown as including a filter module 960, a dictionary module 965, and an aggregation module 970. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The filter module 960 of the central server 130 filters data in the databases 120A-120C to limit responses to queries to only the data that is responsive to a specified filter. For example, a query may specify one or more tables to retrieve data from and a filter that identifies the entries in those tables that are desired. As an example, "select position from worker where name='KARA'" retrieves the position data from the worker table 210, but only for the entry (or entries) that have a name value of "KARA." The filter module 960 checks the name values of the entries and determines which entries match, allowing the database to return only the responsive data.

The dictionary module 965 performs dictionary compression, decompression, or both. For example, the dictionary module 965 may create the compressed worker table 270 and the shift dictionary 240 based on the worker table 210 (all shown in FIG. 2) and a determination that the total storage consumed is reduced by using dictionary compression. As another example, the dictionary module 965 may be used when responding to a query on a compressed table (or micro-partition) to restore the dictionary index values to the data the values represent (e.g., to replace the dictionary entry "1" with the value "SWING," as shown in FIG. 2).

The aggregation module 970 aggregates data stored in multiple entries of the databases 120A-120C in response to queries. For example, a query may request the sum of all hours worked by a worker over a period of time and the aggregation module 970 accesses and sums daily time entries to generate the requested result.

In alternative embodiments, the computer system 900 operates as a standalone device or may be coupled (e.g., networked) to other machines. In a networked deployment, the computer system 900 may operate in the capacity of a server machine or a client machine in a server-client network environment, or as a peer machine in a peer-to-peer (or distributed) network environment. The computer system 900 may comprise, but not be limited to, a server computer, a client computer, a personal computer (PC), a tablet computer, a laptop computer, a netbook, a smart phone, a mobile device, a network router, a network switch, a network bridge, or any machine capable of executing instructions of the program 955, sequentially or otherwise, that specify actions to be taken by the computer system 900. Further, while only a single computer system 900 is illustrated, the term "machine" shall also be taken to include a collection of computer systems 900 that individually or jointly execute the instructions to perform any one or more of the methodologies discussed herein.

The input interface 925 and the output interface 930 include components to receive input, provide output, produce output, transmit information, exchange information, capture measurements, and so on. The specific input/output ("I/O") components that are included in a particular computer system 900 will depend on the type of computer system. For example, portable devices such as mobile phones will likely include a touch input device or other such input mechanisms, while a headless server machine will likely not include such a touch input device. It will be appreciated that the I/O components may include many other components that are not shown in FIG. 9. The input interface 925 may interface with visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input interface 925 may interface with alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 400, 500, 600, and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1

A system comprising:

a memory that stores instructions; and one or more processors configured by the instructions to perform operations comprising:

accessing an operation for a table of a database, the operation for the table comprising a filter on a first column of the table, the table being stored in a plurality of micro-partitions, a micro-partition of the plurality of micro-partitions being compressed;

decompressing a first portion of the micro-partition corresponding to the first column without decompressing a second portion of the micro-partition corresponding to a second column of the table;

decompressing, based on the filter on the first column and the decompressed first portion of the micro-partition, a third portion of the micro-partition containing data responsive to the filter without decompressing a fourth portion of the micro-partition containing data not responsive to the filter; and providing, in response to the operation for the table, the decompressed third portion of the micro-partition.

Example 2

The system of example 1, wherein each micro-partition of the plurality of micro-partitions is a file on a file system.

Example 3

The system of either example 1 or example 2, wherein the filter comprises a value for the first column.

Example 4

The system of any one of examples 1 to 3, wherein the decompressing of the first portion of the micro-partition corresponding to the first column comprises:

accessing a compressed value for each entry in the micro-partition for the first column;

accessing a dictionary that maps compressed values to uncompressed values; and using the dictionary, determining an uncompressed value for each compressed value of the entries in the micro-partition.

Example 5

The system of example 4, wherein the operations further comprise:

providing, in response to the operation for the table, the compressed value for the first column for each entry in the decompressed third portion of the micro-partition.

Example 6

The system of example 5, wherein the operations further comprise:

accessing a second operation for the table, the second operation comprising determining a computation result on the first column of the table;

computing, for a first entry in the third portion of the micro-partition, the computation result on a value of the first column of the first entry;

storing the computation result for the first entry in conjunction with the compressed value for the first entry; and based on the compressed value for a second entry of the table being identical to the compressed value for the first entry, accessing the stored computation result for the first entry instead of computing the computation result on the value for the second entry.

Example 7

The system of any one of examples 1 to 6, wherein the operations further comprise:

performing an aggregation operation on the table by performing operations comprising:

aggregating entries in the table to create a first aggregated data structure comprising aggregated entries;

based on a predetermined threshold and a number of entries in the first aggregated data structure:

transferring the aggregated entries from the first aggregated data structure to a second aggregated data structure; and clearing the aggregated entries in the first aggregated data structure; and resuming aggregating the entries in the table in the first aggregated data structure.

Example 8

The system of example 7, wherein:

the decompressing of the first portion of the micro-partition corresponding to the first column comprises:

accessing a compressed value for each entry in the micro-partition for the first column;

accessing a dictionary that maps compressed values to uncompressed values; and using the dictionary, determining the uncompressed value for each compressed value of the entries in the micro-partition;

the operations further comprise:

providing, in response to the operation for the table, the compressed value for the first column for each entry in the decompressed third portion of the micro-partition; and wherein the aggregating of the entries in the table to create the first aggregated data structure determines to combine a first entry with a second entry based on the compressed value of the first entry being identical to the compressed value of the second entry.

Example 9

The system of any one of examples 1 to 8, wherein:
a second micro-partition of the plurality of micro-partitions is compressed using compression different from the compression of the micro-partition;
the operations further comprise:
decompressing a first portion of the second micro-partition corresponding to the first column without decompressing a second portion of the second micro-partition corresponding to the second column of the table; and
decompressing, based on the filter on the first column and the decompressed first portion of the second micro-partition, a third portion of the second micro-partition containing data responsive to the filter without decompressing a fourth portion of the second micro-partition containing data not responsive to the filter; and
combining the decompressed third portion of the micro-partition with the decompressed third portion of the second micro-partition for provision in response to the operation for the table.

Example 10

A non-transitory machine-readable medium that stores instructions that, when executed by one or more processors, cause the one or more processors to perform operations comprising:
accessing an operation for a table of a database, the operation for the table comprising a filter on a first column of the table, the table being stored in a plurality of micro-partitions, a micro-partition of the plurality of micro-partitions being compressed;
decompressing a first portion of the micro-partition corresponding to the first column without decompressing a second portion of the micro-partition corresponding to a second column of the table;
decompressing, based on the filter on the first column and the decompressed first portion of the micro-partition, a third portion of the micro-partition containing data responsive to the filter without decompressing a fourth portion of the micro-partition containing data not responsive to the filter; and
providing, in response to the operation for the table, the decompressed third portion of the micro-partition.

Example 11

The non-transitory machine-readable medium of example 10, wherein each micro-partition of the plurality of micro-partitions is a file on a file system.

Example 12

The non-transitory machine-readable medium of either example 10 or example 11, wherein the filter comprises a value for the first column.

Example 13

The non-transitory machine-readable medium of any one of examples 10 to 12, wherein the decompressing of the first portion of the micro-partition corresponding to the first column comprises:
accessing a compressed value for each entry in the micro-partition for the first column;
accessing a dictionary that maps compressed values to uncompressed values; and using the dictionary, determining an uncompressed value for each compressed value of the entries in the micro-partition.

Example 14

The non-transitory machine-readable medium of example 13, wherein the operations further comprise:
providing, in response to the operation for the table, the compressed value for the first column for each entry in the decompressed third portion of the micro-partition.

Example 15

The non-transitory machine-readable medium of example 14, wherein the operations further comprise:
accessing a second operation for the table, the second operation comprising determining a computation result on the first column of the table;
computing, for a first entry in the third portion of the micro-partition, the computation result on the first column of the table:
storing the computation result for the first entry in conjunction with the compressed value for the first column; and
based on the compressed value for the second column being identical to the compressed value for the first column, accessing the stored computation result for the first entry instead of computing the computation result on the first column of the table.

Example 16

The non-transitory machine-readable medium of any one of examples 10 to 15, wherein the operations further comprise:
performing an aggregation operation on the table by performing operations comprising:
aggregating entries in the table to create a first aggregated data structure comprising aggregated entries;
based on a predetermined threshold and a number of entries in the first aggregated data structure:
transferring the aggregated entries from the first aggregated data structure to a second aggregated data structure; and
clearing the aggregated entries in the first aggregated data structure; and resuming aggregating the entries in the table in the first aggregated data structure.

Example 17

The non-transitory machine-readable medium of example 16, wherein:
the decompressing of the first portion of the micro-partition corresponding to the first column comprises:
accessing a compressed value for each entry in the micro-partition for the first column;
accessing a dictionary that maps compressed values to uncompressed values; and using the dictionary, determining the uncompressed value for each compressed value of the entries in the micro-partition;
the operations further comprise:
providing, in response to the operation for the table, the compressed value for the first column for each entry in the decompressed third portion of the micro-partition; and wherein the aggregating of the entries in the table to create the first aggregated data structure determines to combine a first entry with a second entry based on the compressed value of the first entry being identical to the compressed value of the second entry.

Example 18

The non-transitory machine-readable medium of any one of examples 10 to 17, wherein:
a second micro-partition of the plurality of micro-partitions is compressed using compression different from the compression of the micro-partition;
the operations further comprise:
decompressing a first portion of the second micro-partition corresponding to the first column without decompressing a second portion of the second micro-partition corresponding to the second column of the table; and
decompressing, based on the filter on the first column and the decompressed first portion of the second micro-partition, a third portion of the second micro-partition containing data responsive to the filter without decompressing a fourth portion of the second micro-partition containing data not responsive to the filter; and
combining the decompressed third portion of the micro-partition with the decompressed third portion of the second micro-partition for provision in response to the operation for the table.

Example 19

A method comprising:
accessing, by one or more processors, an operation for a table of a database, the operation comprising a filter on a first column of the table, the table being stored in a plurality of micro-partitions, a micro-partition of the plurality of micro-partitions being compressed;
decompressing a first portion of the micro-partition corresponding to the first column without decompressing a second portion of the micro-partition corresponding to a second column of the table;
decompressing, based on the filter on the first column and the decompressed first portion of the micro-partition, a third portion of the micro-partition containing data responsive to the filter without decompressing a fourth portion of the micro-partition containing data not responsive to the filter; and
providing, in response to the operation for the table, the decompressed third portion of the micro-partition.

Example 20

The method of example 19, wherein each micro-partition of the plurality of micro-partitions is a file on a file system.

Example 21

The method of either of example 19 or example 20, wherein the filter comprises a value for the first column.

Example 22

The method of any one of examples 19 to 21, wherein the decompressing of the first portion of the micro-partition corresponding to the first column comprises:
accessing a compressed value for each entry in the micro-partition for the first column;
accessing a dictionary that maps compressed values to uncompressed values; and using the dictionary, determining an uncompressed value for each compressed value of the entries in the micro-partition.

Example 23

The method of example 22, further comprising:
providing, in response to the operation for the table, the compressed value for the first column for each entry in the decompressed third portion of the micro-partition.

Example 24

The method of example 23, further comprising:
accessing a second operation for the table, the second operation comprising determining a computation result on the first column of the table;
computing, for a first entry in the third portion of the micro-partition, the computation result on the first column of the table;
storing the computation result for the first entry in conjunction with the compressed value for the first column; and
based on the compressed value for the second column being identical to the compressed value for the first column, accessing the stored computation result for the first entry instead of computing the computation result on the first column of the table.

Example 25

The method of any one of examples 19 to 24, further comprising:
performing an aggregation operation on the table by performing operations comprising:
aggregating entries in the table to create a first aggregated data structure comprising aggregated entries;
based on a predetermined threshold and a number of entries in the first aggregated data structure:
transferring the aggregated entries from the first aggregated data structure to a second aggregated data structure; and
clearing the aggregated entries in the first aggregated data structure; and resuming aggregating the entries in the table in the first aggregated data structure.

Example 26

The method of example 25, wherein:
the decompressing of the first portion of the micro-partition corresponding to the first column comprises:
accessing a compressed value for each entry in the micro-partition for the first column;
accessing a dictionary that maps compressed values to uncompressed values; and using the dictionary, determining the uncompressed value for each compressed value of the entries in the micro-partition;
further comprising:
providing, in response to the operation for the table, the compressed value for the first column for each entry in the decompressed third portion of the micro-partition; and
wherein the aggregating of the entries in the table to create the first aggregated data structure determines to combine a first entry with a second entry based on the compressed value of the first entry being identical to the compressed value of the second entry.

Example 27

The method of any one of examples 19 to 26, wherein:
a second micro-partition of the plurality of micro-partitions is compressed using compression different from the compression of the micro-partition; and further comprising:
decompressing a first portion of the second micro-partition corresponding to the first column without decompressing a second portion of the second micro-partition corresponding to a second column of the table; and
decompressing, based on the filter on the first column and the decompressed first portion of the second micro-partition, a third portion of the second micro-partition containing data responsive to the filter without decompressing a fourth portion of the second micro-partition containing data not responsive to the filter; and
combining the decompressed third portion of the micro-partition with the decompressed third portion of the second micro-partition for provision in response to the operation for the table.

What is claimed is:

1. A system comprising:
a memory that stores instructions; and
one or more processors configured by the instructions to perform operations comprising:
accessing a first operation for a table of a database the first operation for the table comprising a filter on a first column of the table, the table being stored in a plurality of micro-partitions, a first micro-partition of the plurality of micro-partitions of the table being compressed according to a first compression algorithm and a second micro-partition of the plurality of micro-partitions of the table being compressed according to a second compression algorithm;
receiving a query comprising multiple filters comprising the filter;
selecting whether to apply the filter within the database or by a central server, the selecting whether to apply the filter being performed on a filter-by-filter basis for each of the multiple filters, wherein a first filter is applied by the database and a second filter is applied by the central server;
in response to selecting to apply the filter within the database, transmitting the query comprising the filter to the database;
in response to selecting to apply the filter by the central server, transmitting a request for unfiltered data from the database and applying the filter to the unfiltered data received from the database, the request excluding the filter;
decompressing, in the first micro-partition, the first column of the table excluding decompressing other columns of the table in the first micro-partition;
decompressing, based on the filter on the first column, rows of the first micro-partition of the table that contains data responsive to the filter excluding decompressing other rows of the first micro-partition of the table that contains data not responsive to the filter;
providing, in response to the first operation for the table, the decompressed rows of the first micro-partition;

accessing a second operation for the table, the second operation comprising determining a second computation result on the first column of the table;
computing, for a first entry in the rows of the first micro-partition, a first computation result on a first value of the first column of the first entry;
storing the first computation result for the first entry in conjunction with a first compressed value for the first entry; and
based on a second compressed value for a second entry of the table being identical to the first compressed value for the first entry, storing the first computation result as the second computation result instead of computing the second computation result using the second compressed value for the second entry.

2. The system of claim 1, wherein each micro-partition of the plurality of micro-partitions is a file on a file system, wherein the first micro-partition is compressed using dictionary compression and the second micro-partition is compressed using run-length encoding.

3. The system of claim 1, wherein the filter comprises a value for the first column, wherein a first set of columns of the first micro-partition is compressed according to the first compression algorithm and a second set of columns of the first micro-partition is compressed according to a third compression algorithm.

4. The system of claim 1, wherein decompressing the first column comprises:
accessing a compressed value for each entry in the first micro-partition for the first column;
accessing a dictionary that maps compressed values to uncompressed values; and
using the dictionary, determining an uncompressed value for each compressed value of the entries in the first micro-partition.

5. The system of claim 4, wherein the operations further comprise:
providing, in response to the operation for the table, the compressed value for the first column for each entry in the decompressed rows of the first micro-partition.

6. The system of claim 1, wherein the operations further comprise:
performing an aggregation operation on the table by performing operations comprising:
aggregating entries in the table to create a first aggregated data structure comprising aggregated entries;
based on a predetermined threshold and a number of entries in the first aggregated data structure:
transferring the aggregated entries from the first aggregated data structure to a second aggregated data structure; and
clearing the aggregated entries in the first aggregated data structure; and
resuming aggregating the entries in the table in the first aggregated data structure.

7. The system of claim 6, wherein decompressing the first column comprises:
accessing a compressed value for each entry in the first micro-partition for the first column;
accessing a dictionary that maps compressed values to uncompressed values; and
using the dictionary, determining the uncompressed value for each compressed value of the entries in the first micro-partition;

the operations further comprise:
providing, in response to the operation for the table, the compressed value for the first column for each entry in the decompressed rows of the first micro-partition; and
wherein the aggregating of the entries in the table to create the first aggregated data structure determines to combine a first entry with a second entry based on the compressed value of the first entry being identical to the compressed value of the second entry.

8. The system of claim 1, wherein:
the operations further comprise:
decompressing a first column in the second micro-partition excluding decompressing other columns of the table in the second micro-partition; and
decompressing, based on the filter on the first column, rows of the second micro-partition containing data responsive to the filter excluding decompressing other rows of the second micro-partition containing data not responsive to the filter; and
combining the decompressed rows of the micro-partition with the decompressed rows of the second micro-partition for provision in response to the operation for the table.

9. A non-transitory machine-readable medium that stores instructions that, when executed by one or more processors, cause the one or more processors to perform operations comprising:
accessing a first operation for a table of a database the first operation for the table comprising a filter on a first column of the table, the table being stored in a plurality of micro-partitions, a first micro-partition of the plurality of micro-partitions of the table being compressed according to a first compression algorithm and a second micro-partition of the plurality of micro-partitions of the table being compressed according to a second compression algorithm;
receiving a query comprising multiple filters comprising the filter;
selecting whether to apply the filter within the database or by a central server, the selecting whether to apply the filter being performed on a filter-by-filter basis for each of the multiple filters, wherein a first filter is applied by the database and a second filter is applied by the central server;
in response to selecting to apply the filter within the database, transmitting the query comprising the filter to the database;
in response to selecting to apply the filter by the central server, transmitting a request for unfiltered data from the database and applying the filter to the unfiltered data received from the database, the request excluding the filter;
decompressing, in the first micro-partition, the first column of the table excluding decompressing other columns of the table in the first micro-partition;
decompressing, based on the filter on the first column, rows of the first micro-partition of the table that contains data responsive to the filter excluding decompressing other rows of the first micro-partition of the table that contains data not responsive to the filter;
providing, in response to the first operation for the table, the decompressed rows of the first micro-partition;
accessing a second operation for the table, the second operation comprising determining a second computation result on the first column of the table;
computing, for a first entry in the rows of the first micro-partition, the first computation result on a first value of the first column of the first entry;
storing the first computation result for the first entry in conjunction with a first compressed value for the first entry; and
based on a second compressed value for a second entry of the table being identical to the first compressed value for the first entry, storing the first computation result as the second computation result instead of computing the second computation result using the second compressed value for the second entry.

10. The non-transitory machine-readable medium of claim 9, wherein the operations further comprise determining whether to apply the filter within the database to perform the selecting operation based on different criteria, a first of the different criteria indicating performance of the filter by the central server in case the filter comprises disjunct filtering criteria, a second of the different criteria indicating performance of the filter by the central server in case the filter is a function of multiple columns.

11. The non-transitory machine-readable medium of claim 9, wherein decompressing first column comprises:
accessing a compressed value for each entry in the first micro-partition for the first column;
accessing a dictionary that maps compressed values to uncompressed values; and
using the dictionary, determining an uncompressed value for each compressed value of the entries in the first micro-partition.

12. The non-transitory machine-readable medium of claim 11, wherein the operations further comprise:
providing, in response to the operation for the table, the compressed value for the first column for each entry in the decompressed rows of the first micro-partition.

13. The non-transitory machine-readable medium of claim 9, wherein the operations further comprise:
performing an aggregation operation on the table by performing operations comprising:
aggregating entries in the table to create a first aggregated data structure comprising aggregated entries;
based on a predetermined threshold and a number of entries in the first aggregated data structure:
transferring the aggregated entries from the first aggregated data structure to a second aggregated data structure; and
clearing the aggregated entries in the first aggregated data structure; and
resuming aggregating the entries in the table in the first aggregated data structure.

14. The non-transitory machine-readable medium of claim 13, wherein decompressing the first column comprises:
accessing a compressed value for each entry in the first micro-partition for the first column;
accessing a dictionary that maps compressed values to uncompressed values; and
using the dictionary, determining the uncompressed value for each compressed value of the entries in the first micro-partition;
and wherein the operations further comprise:
providing, in response to the operation for the table, the compressed value for the first column for each entry in the decompressed rows of the first micro-partition; and
wherein the aggregating of the entries in the table to create the first aggregated data structure determines to combine a first entry with a second entry based on the compressed value of the first entry being identical to the compressed value of the second entry.

15. The non-transitory machine-readable medium of claim 9, wherein:
the operations further comprise:
decompressing a first column in the second micro-partition excluding decompressing other columns of the table in the second micro-partition; and
decompressing, based on the filter on the first column, rows of the second micro-partition containing data responsive to the filter excluding decompressing other rows of the second micro-partition containing data not responsive to the filter; and
combining the decompressed rows of the micro-partition with the decompressed rows of the second micro-partition for provision in response to the operation for the table.

16. A method comprising:
accessing a first operation for a table of a database the first operation for the table comprising a filter on a first column of the table, the table being stored in a plurality of micro-partitions, a first micro-partition of the plurality of micro-partitions of the table being compressed according to a first compression algorithm and a second micro-partition of the plurality of micro-partitions of the table being compressed according to a second compression algorithm;
receiving a query comprising multiple filters comprising the filter;
selecting whether to apply the filter within the database or by a central server, the selecting whether to apply the filter being performed on a filter-by-filter basis for each of the multiple filters, wherein a first filter is applied by the database and a second filter is applied by the central server;
in response to selecting to apply the filter within the database, transmitting the query comprising the filter to the database;
in response to selecting to apply the filter by the central server, transmitting a request for unfiltered data from the database and applying the filter to the unfiltered data received from the database, the request excluding the filter;
decompressing, in the first micro-partition, the first column of the table excluding decompressing other columns of the table in the first micro-partition;
decompressing, based on the filter on the first column, rows of the first micro-partition of the table that contains data responsive to the filter excluding decompressing other rows of the first micro-partition of the table that contains data not responsive to the filter;
providing, in response to the first operation for the table, the decompressed rows of the first micro-partition;
accessing a second operation for the table, the second operation comprising determining a second computation result on the first column of the table;
computing, for a first entry in the rows of the first micro-partition, the first computation result on a first value of the first column of the first entry;
storing the first computation result for the first entry in conjunction with a first compressed value for the first entry; and
based on a second compressed value for a second entry of the table being identical to the first compressed value for the first entry, storing the first computation result as the second computation result instead of computing the second computation result using the second compressed value for the second entry.

17. The method of claim 16, wherein each micro-partition of the plurality of micro-partitions is a file on a file system.

18. The method of claim 16, wherein the filter comprises a value for the first column.

19. The method of claim 16, wherein decompressing the first column comprises:
accessing a compressed value for each entry in the first micro-partition for the first column;
accessing a dictionary that maps compressed values to uncompressed values; and
using the dictionary, determining an uncompressed value for each compressed value of the entries in the micro-partition.

20. The method of claim 19, further comprising:
providing, in response to the operation for the table, the compressed value for the first column for each entry in the decompressed rows of the first micro-partition.

21. The method of claim 16, further comprising:
performing an aggregation operation on the table by performing operations comprising:
aggregating entries in the table to create a first aggregated data structure comprising aggregated entries;
based on a predetermined threshold and a number of entries in the first aggregated data structure:
transferring the aggregated entries from the first aggregated data structure to a second aggregated data structure; and
clearing the aggregated entries in the first aggregated data structure; and
resuming aggregating the entries in the table in the first aggregated data structure.

22. The method of claim 21, wherein decompressing the first column comprises:
accessing a compressed value for each entry in the first micro-partition for the first column;
accessing a dictionary that maps compressed values to uncompressed values; and
using the dictionary, determining the uncompressed value for each compressed value of the entries in the first micro-partition;
further comprising:
providing, in response to the operation for the table, the compressed value for the first column for each entry in the decompressed rows of the first micro-partition; and
wherein the aggregating of the entries in the table to create the first aggregated data structure determines to combine a first entry with a second entry based on the compressed value of the first entry being identical to the compressed value of the second entry.

23. The method of claim 16, wherein the first micro-partition is compressed using dictionary compression and the second micro-partition is compressed using run-length encoding.

24. The method of claim 23, wherein the method further comprises: decompressing a first column in the second micro-partition excluding decompressing other columns of the table in the second micro-partition.

25. The method of claim 24, wherein the method further comprises: decompressing, based on the filter on the first column, rows of the second micro-partition containing data responsive to the filter excluding decompressing other rows of the second micro-partition containing data not responsive to the filter.

26. The method of claim 24, wherein the method further comprises: combining the decompressed rows of the micro-partition with the decompressed rows of the second micro-partition for provision in response to the operation for the table.

\* \* \* \* \*